(12) United States Patent
Holbein et al.

(10) Patent No.: US 7,992,817 B2
(45) Date of Patent: *Aug. 9, 2011

(54) BELT RETRACTOR FOR A SAFETY BELT SYSTEM AND METHOD OF DETERMINING THE BELT WEBBING UNWINDING IN A BELT RETRACTOR

(75) Inventors: Wolfgang Holbein, Alfdorf (DE); Artur Klein, Schwaebisch Gmuend (DE); Michael Stuetz, Gschwend (DE)

(73) Assignee: TRW Automotive GmbH, Alfdorf (DE)

( * ) Notice: Subject to any disclaimer, the term of this patent is extended or adjusted under 35 U.S.C. 154(b) by 247 days.

This patent is subject to a terminal disclaimer.

(21) Appl. No.: 11/974,822

(22) Filed: Oct. 16, 2007

(65) Prior Publication Data
US 2008/0105777 A1   May 8, 2008

(30) Foreign Application Priority Data

Nov. 3, 2006  (DE) .......................... 10 2006 051 969

(51) Int. Cl.
*B60R 22/38* (2006.01)
(52) U.S. Cl. .................. 242/382.1; 242/382.4; 242/383
(58) Field of Classification Search ............... 242/379.1, 242/382.1, 382.4, 383; 180/268; 280/807
See application file for complete search history.

(56) References Cited

U.S. PATENT DOCUMENTS

| | | | | |
|---|---|---|---|---|
| 5,553,804 | A * | 9/1996 | Hamann | 242/382.4 |
| 6,290,160 | B1 * | 9/2001 | Strobel | 242/383 |
| 6,425,541 | B1 | 7/2002 | Strobel | |
| 6,616,186 | B1 | 9/2003 | Midorikawa et al. | |
| 6,682,098 | B2 | 1/2004 | Specht | |
| 6,726,249 | B2 * | 4/2004 | Yano et al. | 280/805 |
| 6,786,294 | B2 | 9/2004 | Specht | |
| 7,080,801 | B2 | 7/2006 | Prokscha et al. | |
| 2007/0040058 | A1 * | 2/2007 | Koide | 242/374 |

FOREIGN PATENT DOCUMENTS

| | | |
|---|---|---|
| DE | 19922720 | 11/2000 |
| DE | 10136267 | 2/2002 |
| DE | 10156837 | 6/2003 |
| DE | 20311004 | 1/2004 |

* cited by examiner

*Primary Examiner* — Sang Kim
(74) *Attorney, Agent, or Firm* — Tarolli, Sundheim, Covell & Tummino LLP (57) ABSTRACT

A belt retractor for a safety belt system includes a frame, a belt reel rotatably mounted in the frame, a force limiter, a locking mechanism which couples the belt reel in a restraint case to the frame via the force limiter, and a belt webbing unwinding measuring means which includes a signal transmitter and at least one sensor. The sensor is associated with the signal transmitter and detects a change in a magnetic field. At least upon activation of the locking mechanism the signal transmitter is coupled to the belt reel such that it generates a signal upon rotation of the belt reel.

17 Claims, 8 Drawing Sheets

BELT RETRACTOR FOR A SAFETY BELT SYSTEM AND METHOD OF DETERMINING THE BELT WEBBING UNWINDING IN A BELT RETRACTOR

TECHNICAL FIELD

The invention relates to a belt retractor for a safety belt system and a method of determining the belt webbing unwinding in a belt retractor.

BACKGROUND OF THE INVENTION

In motor vehicles the performance of occupant protection devices, e.g. of force limiters used in belt retractors, is increasingly adapted depending on the seriousness of an accident and the position of the occupant. For this purpose the information as to the relative or absolute belt webbing unwinding is very helpful.

In belt retractors in which a retractor drive spring for winding up the belt webbing is supported by a motor to ensure an increased comfort in the fastened state, it is likewise necessary to recognize the belt webbing unwinding or the belt webbing position to detect whether the belt is in a fastened position, in which it does not move and abuts at a vehicle occupant, or moves at all. The assisting motor may then be activated as required.

To determine the belt webbing unwinding in a belt retractor, systems are known, in which a control disk of a child safety system is provided with a signal transmitter so that the rotation of the control disk may be detected via an associated sensor. During the normal driving operation the control disk is coupled to the belt reel via a reduction gear such that the complete belt webbing unwinding is mapped to approximately one rotation of the control disk. In this manner the belt reel rotations and thus the belt webbing unwinding may be detected.

The invention creates a belt retractor for a safety belt system and a method of determining the belt webbing unwinding, by means of which the relative belt webbing unwinding may be determined by simple means in a restraint case.

BRIEF SUMMARY OF THE INVENTION

This is achieved in a belt retractor for a safety belt system including a frame, a belt reel rotatably mounted in the frame, a force limiter, a locking mechanism which couples the belt reel in a restraint case to the frame via the force limiter, and a belt webbing unwinding measuring means which includes a signal transmitter and at least one sensor. The sensor is associated with the signal transmitter and detects a change in a magnetic field. At least upon activation of the locking mechanism the signal transmitter is coupled to the belt reel such that it generates a signal upon rotation of the belt reel.

. . . In contrast to the systems described in the prior art, a detection of the belt webbing unwinding is (also) possible in a force limitation phase upon "locking" the belt reel, in which on account of the forward movement of the vehicle occupant a certain length of the belt webbing is withdrawn and, in so doing, the belt reel is rotated whilst overcoming the force limiter. Of course, the sensor may likewise be coupled to the belt reel, and the signal transmitter may be disposed in non-rotational arrangement, for example on the frame.

Preferably, the magnetic field is generated by a permanent magnet, hence is constantly present.

A design that may particularly easily be implemented is obtained if the signal transmitter is disposed on the side of the belt reel facing away from the locking mechanism.

In a preferred further development of the invention the signal transmitter includes at least one (permanent) magnet. This is in particular one or a plurality of single or bar magnets, a closed or open magnetic ring, or a magnetic disk.

A simple and reliable possibility to detect the belt reel rotation results from the change in the magnetic field being achieved by a rotation of the signal transmitter relative to the sensor. In particular, the signal transmitter participates in a rotation with the belt reel, it being possible to dispose a reduction gear between these two components.

In a rotating signal transmitter the axis of the magnet may be oriented so as to be parallel, perpendicular or at an acute angle to the axis of rotation of the signal transmitter. In the sense of the invention the axis of the magnet denotes the connecting line of the north and south poles. Moreover, the magnet may be disposed centrically or eccentrically with respect to the axis of rotation. The orientation of the magnet preferred for the concrete design in particular depends on the sensor used which in turn may be disposed centrically with respect to the generated magnetic field or in a radially displaced relationship relative thereto.

Provided according to a first preferred embodiment is a pyrotechnical tensioning unit, upon activation of which the signal transmitter is coupled to the belt reel. In an accident the pyrotechnical tensioning unit is activated, whereupon the belt webbing unwinding measuring means detects the belt webbing unwinding. This embodiment is particularly suited, if the determination of the belt webbing unwinding is only relevant during an accident. Of course, the design described may be combined with an additional belt webbing unwinding measuring means which detects the belt webbing unwinding during the normal driving operation, but is deactivated in a restraint case when the locking mechanism is activated.

In particular, the signal transmitter is integrated into a gearing via which the pyrotechnical tensioning unit is coupled to the belt reel upon its activation. Hence, a component existing anyway, namely a toothed wheel of the gearing, is used. Achieved as a result thereof is a space-saving design which does not influence the wind-up behavior.

A further preferred embodiment of the invention provides that the signal transmitter is disposed on a component of the belt retractor that is coaxially connected to the belt reel. Some construction space may again be saved, and the wind-up behavior is not influenced.

Preferably, the belt reel includes an axial pin made of metal which passes through the component. Thus, dependent on the material of the axial pin the magnetic field which serves to measure the belt webbing unwinding may be amplified (ferromagnetic or soft magnetic material) or remain uninfluenced (hard magnetic material).

In particular, the signal transmitter is disposed on a spring core of a retractor drive spring. Since the spring core already participates in a rotation of the belt reel in the normal retractor operation as well, hence prior to a possible accident, the detected belt webbing unwinding signal may be used for active, motor-assisted additional functions.

According to a further embodiment of the invention the signal transmitter includes a separate wheel that is coupled to the belt reel.

The wheel may be disposed axially adjacent to the belt reel; a coaxial arrangement is conceivable as an alternative.

According to a first alternative the wheel is a magnetic wheel, hence for example a toothed wheel including a magnet embedded therein.

As an alternative, the wheel may be a toothed iron wheel which cooperates with a permanent magnet disposed in a spaced-apart relationship to the wheel and which amplifies or reduces the magnetic field of the permanent magnet depending on the position of the wheel.

A direct measurement of the angle of rotation of the belt reel is possible, if the sensor is a magnetic turning angle transmitter. This sensor preferably has a measuring range of 360° and may be based on the Hall, GMR, or AMR effect. The sensor delivers the absolute angle, the angular velocity, or an incremental signal including or without direction signal as an output signal.

As an alternative, the sensor may be a magnetic-field sensor which measures the magnetic field strength or magnetic flux density.

Preferably, the sensor is coupled to a control device which detects the belt webbing unwinding from the signals emitted by the sensor. The control device is for example a control device for a gas bag module which exists in the vehicle anyway.

If the sensor is not provided with any interface that is compatible to the read-in control device, the signals emitted by the sensor may first of all be converted by a microcontroller and passed on to the control device.

Provided according to a second aspect of the invention is a method of determining the belt webbing unwinding in a belt retractor which is in particular configured in the manner described before, a sensor detecting the rotation of a belt reel during a force limitation phase of the belt retractor. This information may for example be used to switch a switchable force limiter during the restraint or force limitation phase.

Preferably, the sensor detects any rotation of the belt reel, even already prior to a force limitation phase. In this case the detected signals may also be used for active, motor-assisted additional functions.

BRIEF DESCRIPTION OF THE PREFERRED EMBODIMENTS

Figure 1:
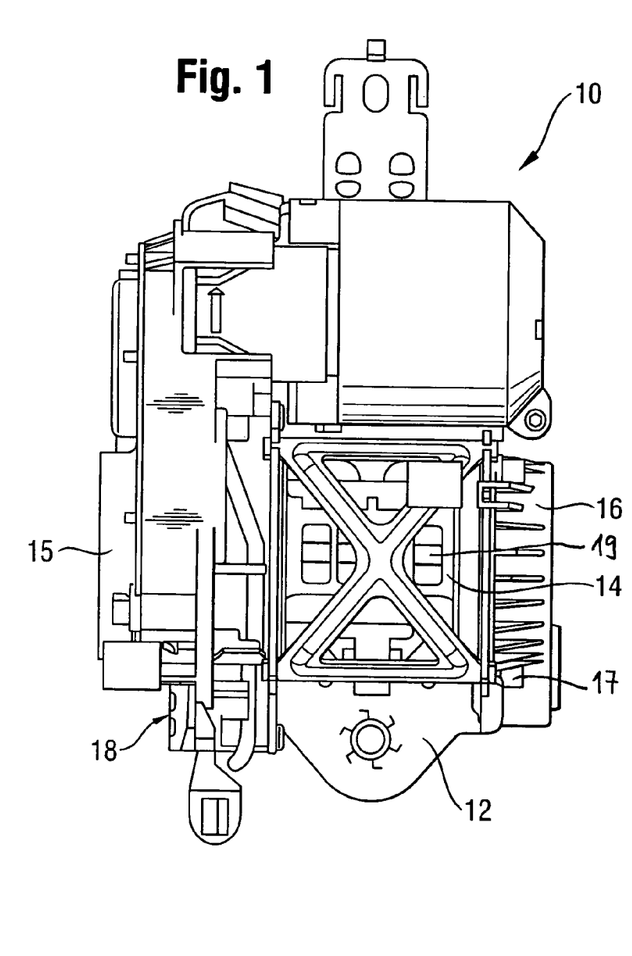
FIG. 1 shows a view of a belt retractor according to a first embodiment of the invention.
Figure 2:
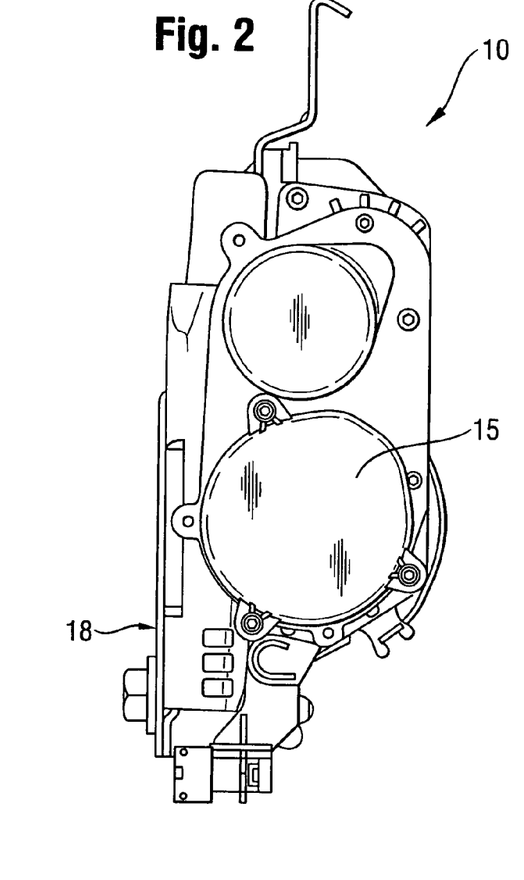
FIG. 2 shows a side view of the belt retractor of FIG. 1.

FIGS. 1 to 4 show a belt retractor 10 according to a first embodiment of the invention, which includes a belt reel 14 that is rotatably mounted in a frame 12 and on which the belt webbing not represented in the figures is wound up. The axis of the belt reel 14 is jeweled between a drive spring shell 15, in which a retractor drive spring for winding up the belt webbing, which is not illustrated, is accommodated, and a locking side shell 16. Accommodated in the locking side shell 16 is a locking mechanism 17 which registers via a vehicle-sensitive sensor and a sensor that is sensitive to the belt webbing a deceleration of the vehicle and of the occupant, respectively, and, if necessary, couples the belt reel 14 to the frame 12 via a force limiter 19. The locking mechanism 17 and the force limiter 19 as a torsion bar are schematically shown in FIG. 1.

Figure 3:
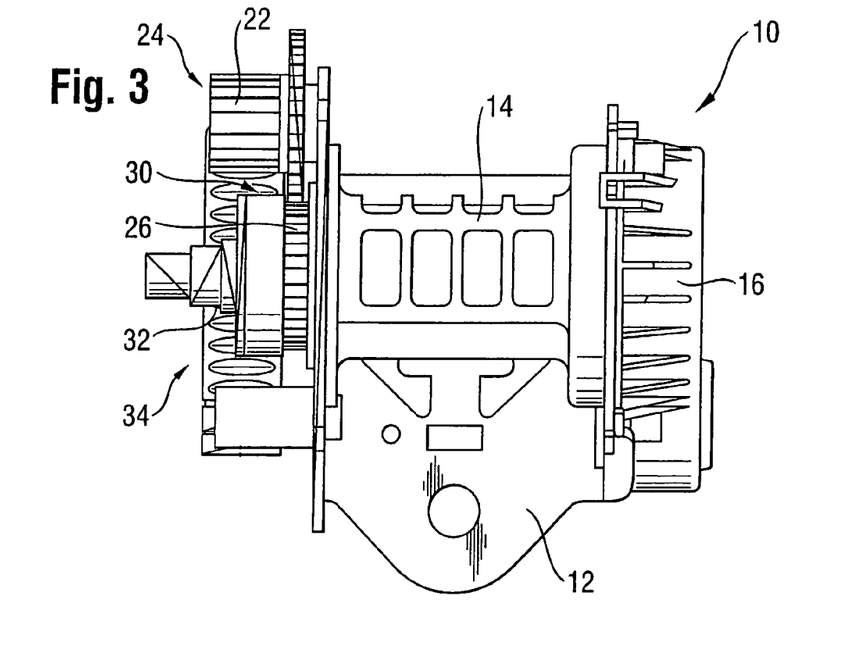
FIG. 3 shows a view of those components of the belt retractor of FIG. 1 that are essential to the function of the belt webbing unwinding measuring means.

The belt retractor 10 further includes a pyrotechnical tensioning unit 18 including a piston 20 which, upon activation of the tensioning unit 18, is acted upon by the compressed gas generated by a gas generator and moves along a cylinder (not shown). Thereby, the piston 20 drives a stepped gear wheel 22 which is part of a gearing 24 that couples the pyrotechnical tensioning unit 18 to the belt reel 14 upon its activation. The gearing 24 further includes a hub 26 which may directly be coupled to the belt reel 14 via a clamping roller coupling 28 (see FIG. 4). Attached to the hub 26 is a signal transmitter 30 in the shape of a magnetic ring or a magnetic disk of a permanent magnetic material which forms a belt webbing unwinding measuring means 34 along with an associated sensor 32 (FIG. 3).

Figure 3A:
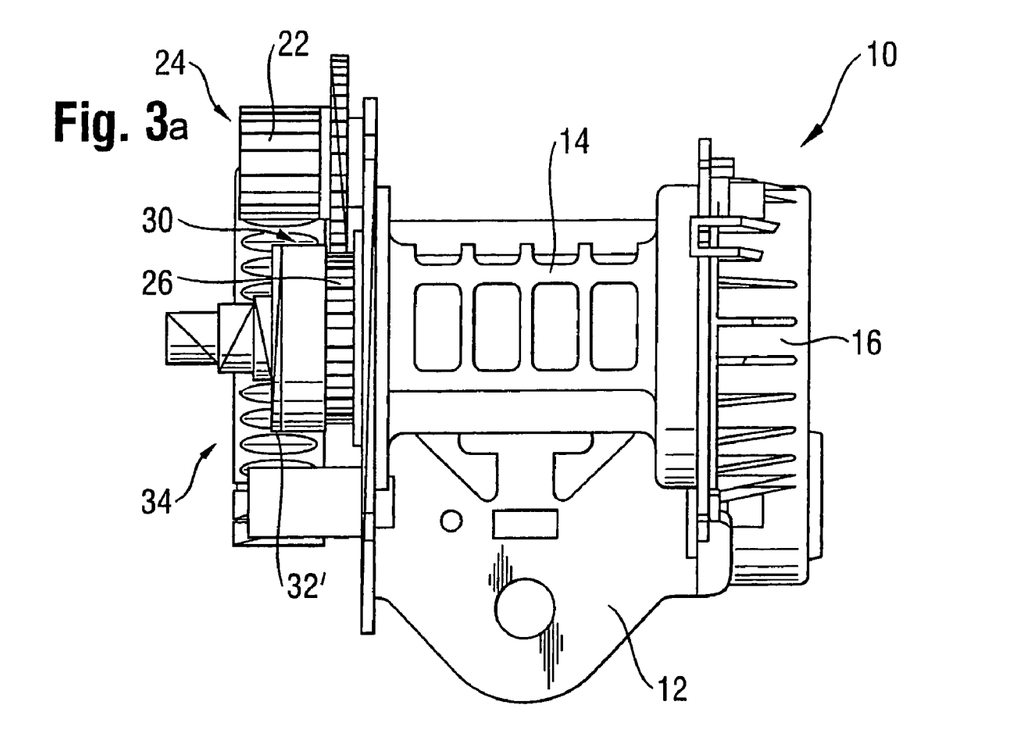
FIG. 3a shows a view corresponding to FIG. 3 with a sensor in an alternative position.
Figure 4:
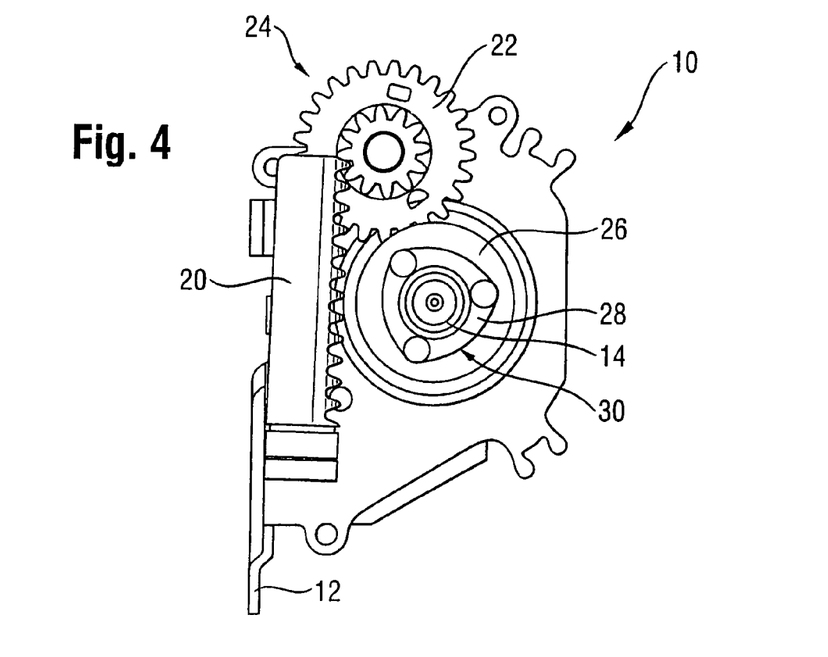
FIG. 4 shows a view of the pyrotechnical tensioning unit of the belt retractor of FIG. 1.
Figure 5:
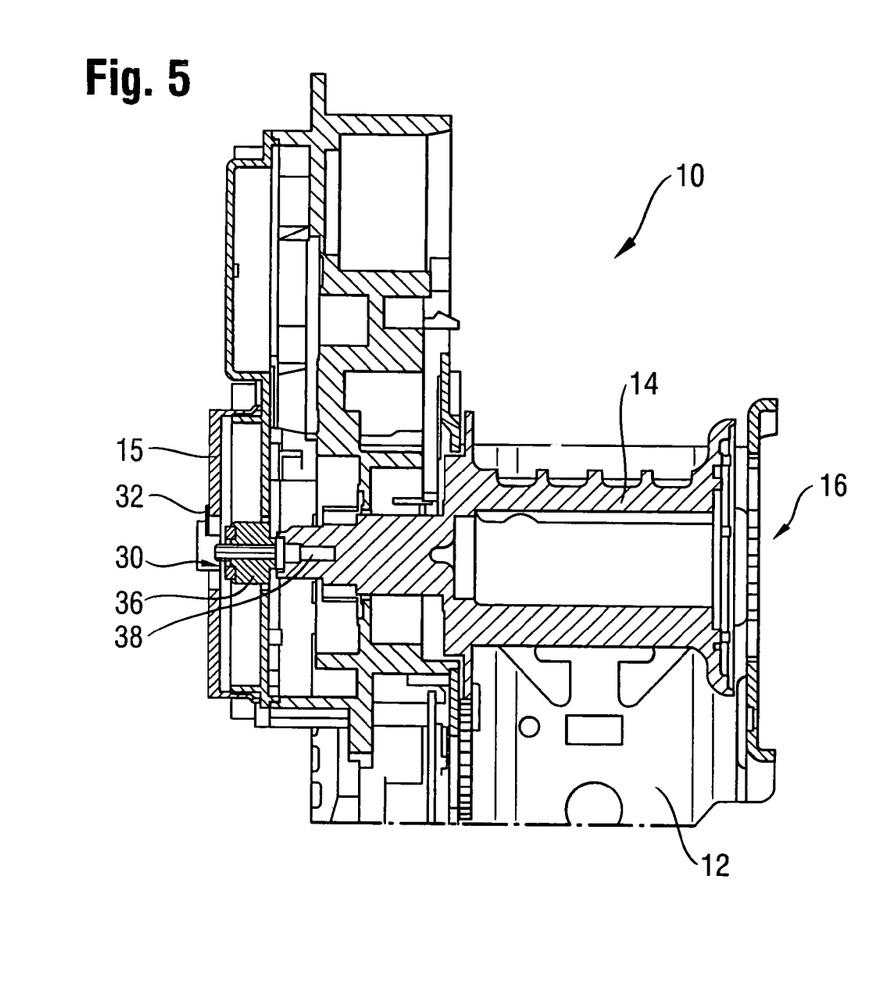
FIG. 5 shows a sectional view of a belt retractor according to a second embodiment of the invention.
Figure 6:
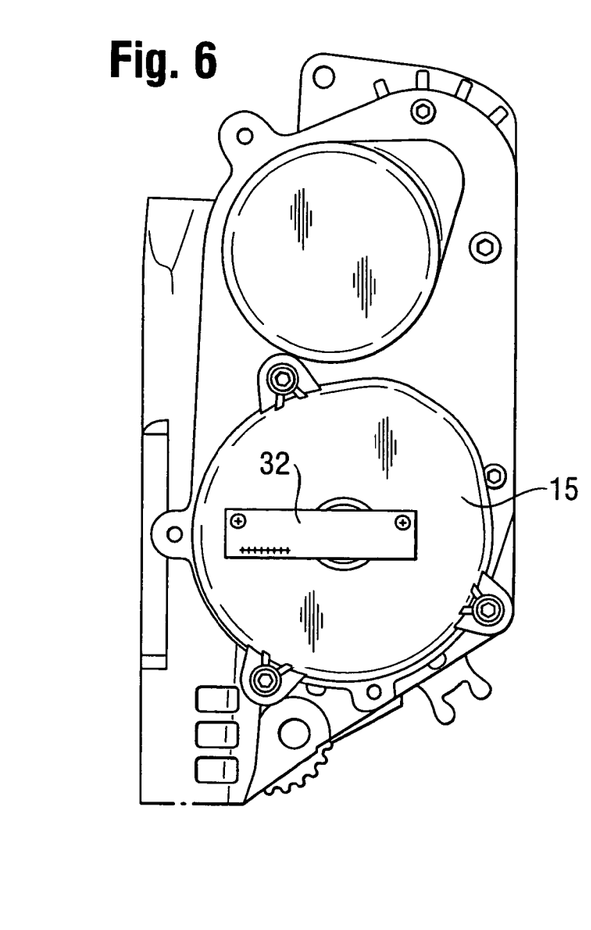
FIG. 6 shows a side view of the belt retractor of FIG. 5.
Figure 7:
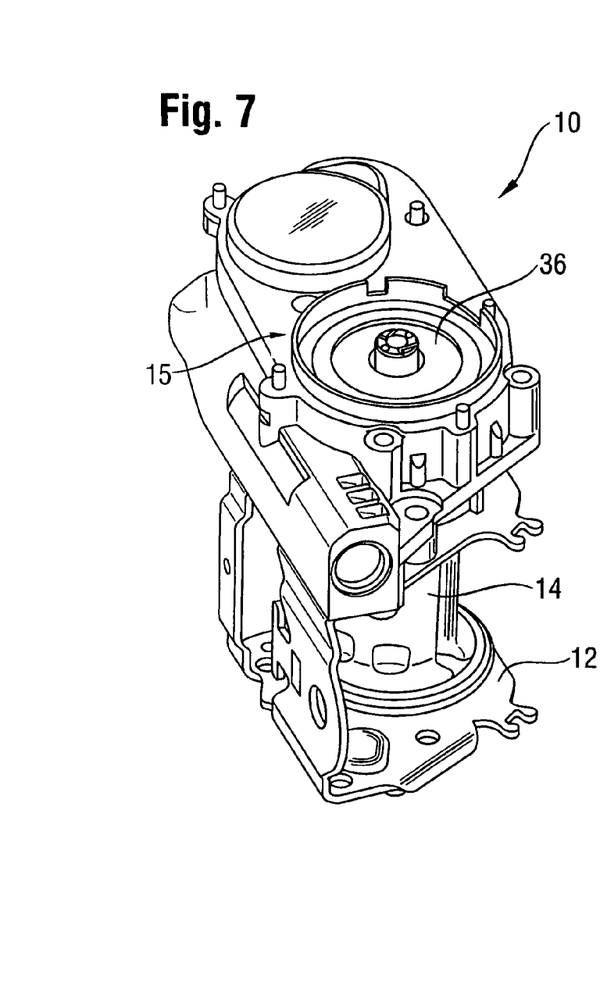
FIG. 7 shows a perspective view of the belt retractor of FIG. 5.

In a restraint case the pyrotechnical tensioning unit 18 is activated by igniting the gas generator, and the piston 20 moves upwards with respect to the representation in FIG. 4. The stepped gear wheel 22 and the hub 26 start to rotate. The signal transmitter 30 rotates as well with the hub 26 relative to the sensor 32 which is disposed in a frame-fixed manner and which detects the change in the magnetic field generated by the permanent magnet of the signal transmitter 30. On account of the rotation of the hub 26 the rollers of the clamping roller coupling 28 are caused to engage and firmly connect the hub 26 to the belt reel 14. Belt webbing is wound up. If during the accident a force limitation phase occurs, in which the belt reel 14 that is coupled to the frame 12 via the force limiter 19 is caused to rotate by means of a strong traction at the belt webbing, the gearing 24 is also reversely rotated along with the belt reel 14 against the tensioning direction. On account of the rotation of the signal transmitter 30 connected to the hub 26 the angular position of the magnetic field generated by the permanent magnet changes relative to the sensor 32. This change is detected by the sensor 32 which may, as an alternative, be attached to the position 32' which is shown in FIG. 3a.

In the belt retractor 10 the signal transmitter 30, which is disposed on the side of the belt reel 14 facing away from the locking mechanism 17, is coupled to the belt reel 14 upon activation of the pyrotechnical tensioning unit 18. In particular, upon activation of the locking mechanism 17 the signal transmitter 30 is hence coupled to the belt reel 14 and generates a signal upon rotation of the latter.

Figure 3B:
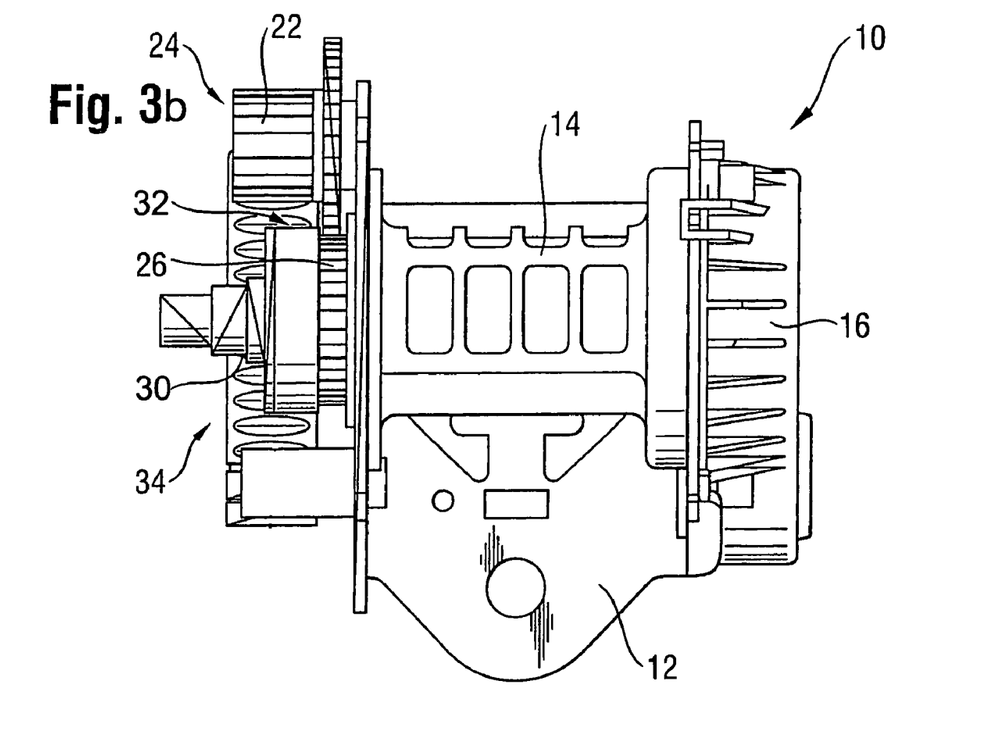
FIG. 3b shows a view corresponding to FIG. 3 with a sensor and a signal transmitter in a further alternative position.

Of course, in contrast to the design described the signal transmitter 30 could also be disposed on the frame 12, and the sensor 32 could be coupled to the belt reel 14 which is shown in FIG. 3b.

FIGS. 5 to 8 show a belt retractor 10 according to a second embodiment of the invention, the same components or components having the same function being provided with the same reference numbers and solely the differences to the embodiment described before being discussed hereinafter. In contrast to the belt retractor 10 described so far, in the design of FIGS. 5 to 8 the signal transmitter 30 is disposed on a component of the belt retractor 10 which is coaxially connected to the belt reel 14, in this arrangement on a spring core 36 of the retractor drive spring, which is disposed beneath the drive spring shell 15. Of course, the signal transmitter 30 may also be integrated into the spring core 36. The belt reel 14 includes an axial pin 38 made of metal which passes through the spring core 36 and, depending on the material selected, is ferromagnetic, soft magnetic, or hard magnetic; hence influences the magnetic field generated by the signal transmitter 30 in different ways. In this arrangement as well, the signal transmitter 30 comprises one or a plurality of permanent magnets 40 which may be arranged centrically or eccentrically with respect to the axis of the belt reel 14. This is shown in FIGS. 8a-g. The sensor 32 may be attached centrally above the generated magnetic field, in a radially displaced relationship relative thereto, or adjacent to the magnet or magnets 40 (see FIGS. 8a-g). In this embodiment the rotation of the belt reel 14 may be detected both in the normal retractor operation and during a force limitation phase in an accident.

Figure 8:
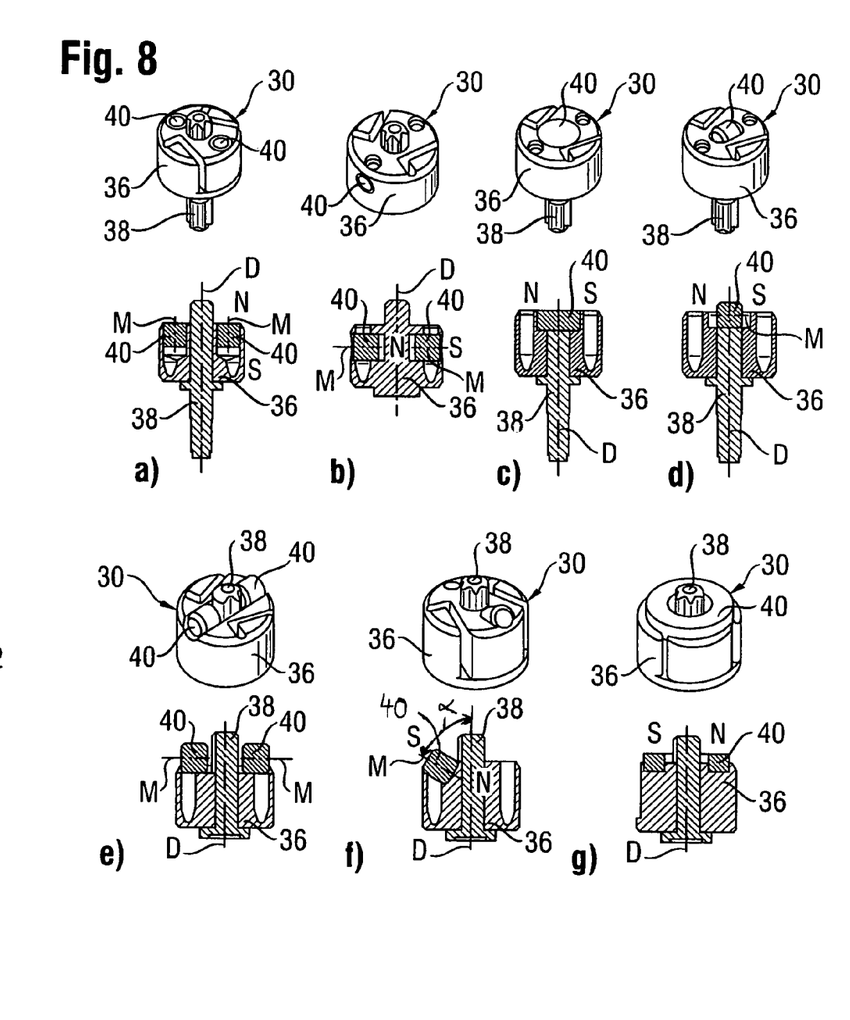
FIGS. 8a to 8g show different possibilities of arranging magnetic signal transmitters in the belt retractor of FIGS. 5 to 7, each in a perspective view and in the longitudinal section.

FIG. 8 shows various possibilities to arrange the magnet or magnets 40 of the signal transmitter 30 on or in the spring core 36. In these arrangements M designates in each case the axis of the magnet 40, hence the connecting line from the north pole N to the south pole S. The design according to FIG. 8a includes two permanent magnets 40 whose axes M are oriented parallel to the axis of rotation D of the spring core 36 and thus of the signal transmitter 30. FIG. 8b shows a variant including two permanent magnets 40 whose axes M extend perpendicularly to the axis of rotation D. According to FIG. 8c there is provided a centrically disposed magnetic ring 40, FIG. 8d shows a cylindrical bar magnet 40 which is disposed in a horizontal position, its axis M being perpendicular to the axis of rotation D. FIG. 8e shows a similar design, but including two horizontal permanent magnets 40 outside the spring core 36, in order to minimize the influences of the retractor drive spring to the signal detection. FIG. 8f shows a permanent magnet 40 whose axis M has an angle α of approximately 60° to the axis of rotation D; FIG. 8g shows a ring magnet 40 which includes a center hole and is likewise disposed outside the spring core 36.

Figure 9:
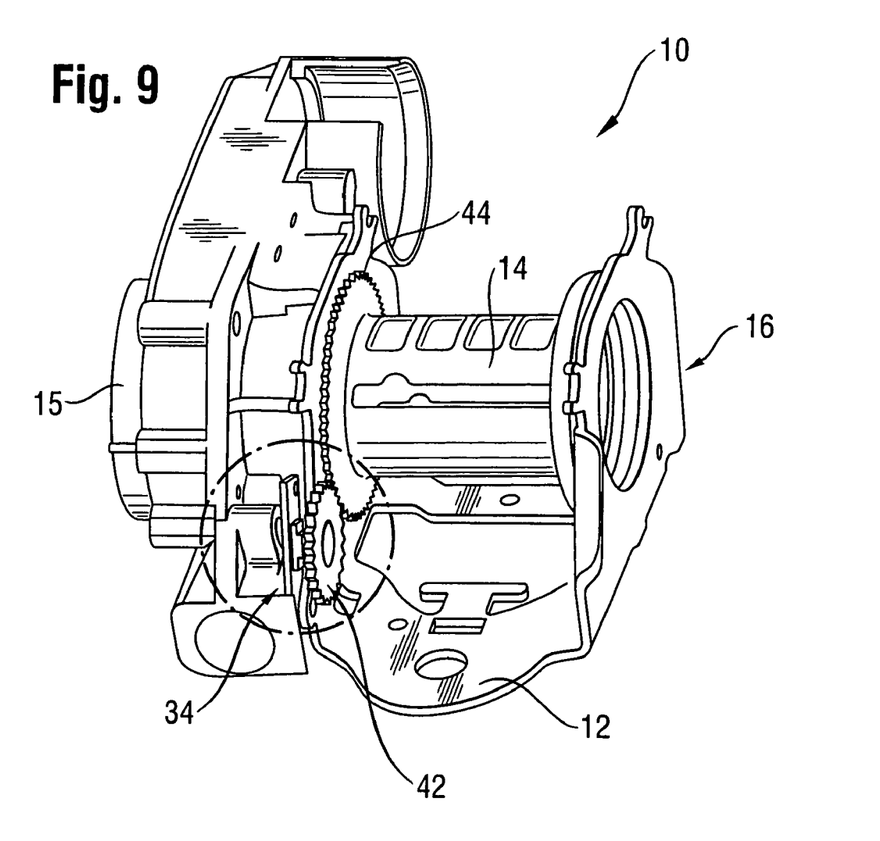
FIG. 9 shows a perspective view of a belt retractor according to a third embodiment of the invention.
Figure 10:
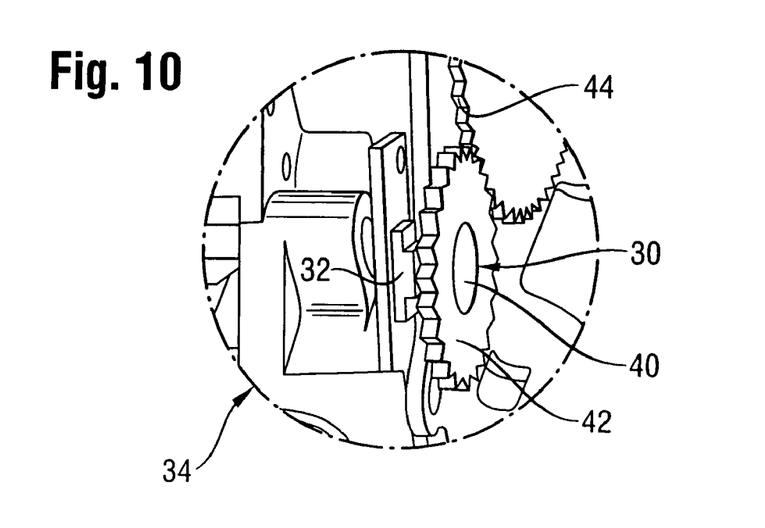
FIG. 10 shows an enlarged detail of FIG. 9.

FIGS. 9 and 10 show a belt retractor 10 according to a further embodiment of the invention, in which the signal transmitter 30 includes a separate wheel 42 which is coupled to the belt reel 14 and disposed axially adjacent to the belt reel 14, and which communicates with the belt reel 14 itself or a component that is disposed coaxially to the latter via a toothing 44 or a frictional connection. When the belt reel 14 rotates, the wheel 42, which is designed as a magnetic wheel, in this arrangement as a toothed wheel including an inner permanent magnet 40, rotates as well. The rotation is detected by the sensor 32 which is attached to the frame 12. The rotation of the belt reel 14 may again be detected both in the normal retractor operation and during a force limitation phase.

Figure 11:
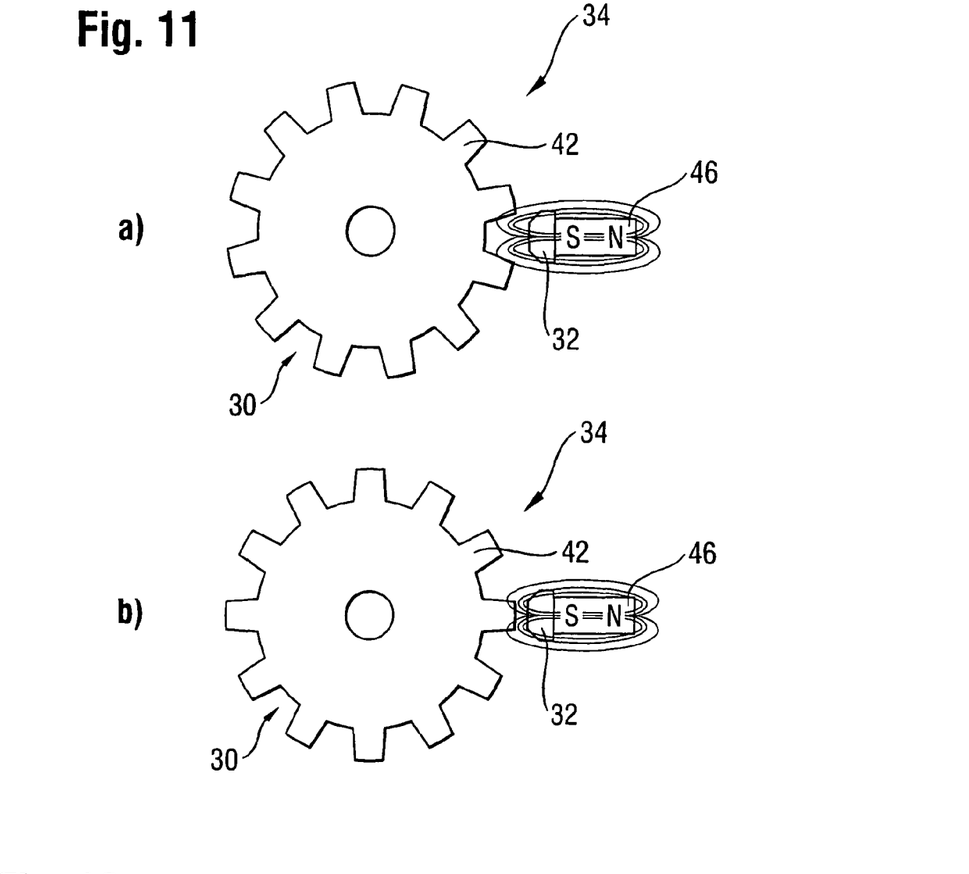
FIGS. 11a and 11b show schematic representations of an alternative belt webbing unwinding measuring means as may be used in the belt retractor of FIG. 9.

FIG. 11 shows a belt webbing unwinding measuring means 34 which may as an alternative be used in the belt retractor 10 of FIGS. 9 and 10. In this belt webbing unwinding measuring means 34 the wheel 42 is configured as a toothed iron wheel which cooperates with a permanent magnet 46 that is disposed spaced apart from the wheel 42. The iron wheel 42 in turn is directly or indirectly connected to the belt reel 14. A Hall sensor which is positioned between the magnet 46 and the iron wheel 42 serves as the sensor 32. By rotating the iron wheel 42 the magnetic field of the magnet 46 is amplified or reduced depending on the position of the toothing, and this is measured by the Hall sensor 32. If a plurality of sensors 32 are positioned in an offset relationship, the accuracy may correspondingly be increased, and the direction of rotation may be determined.

The embodiments of FIGS. 5 to 11 provide the possibility to use the signal emitted by the sensor 32 for active, motor-assisted additional functions. Moreover, by a combination with an absolute signal of the child safety system an absolute measuring signal is possible.

Preferably used in the embodiments of FIGS. 1 to 10 as the sensor 32 is a magnetic turning angle transmitter which has a measuring range of 360° and is based on the Hall, GMR, or AMR effect. This sensor delivers the absolute angle, the angular velocity, or an incremental signal including or without a direction signal as an output signal.

Suited as the sensor 32 for the embodiment of FIG. 11 is a magnetic field sensor which measures the magnetic field strength or the magnetic flux density. In so doing, it is sufficient if the sensor is able to distinguish between the two states "large flux density" and "low flux density". The sensors 32 which are optimized to this application are known under the designations "gear tooth sensor", "cam shaft sensor", or "gear wheel sensor".

Figure 12:
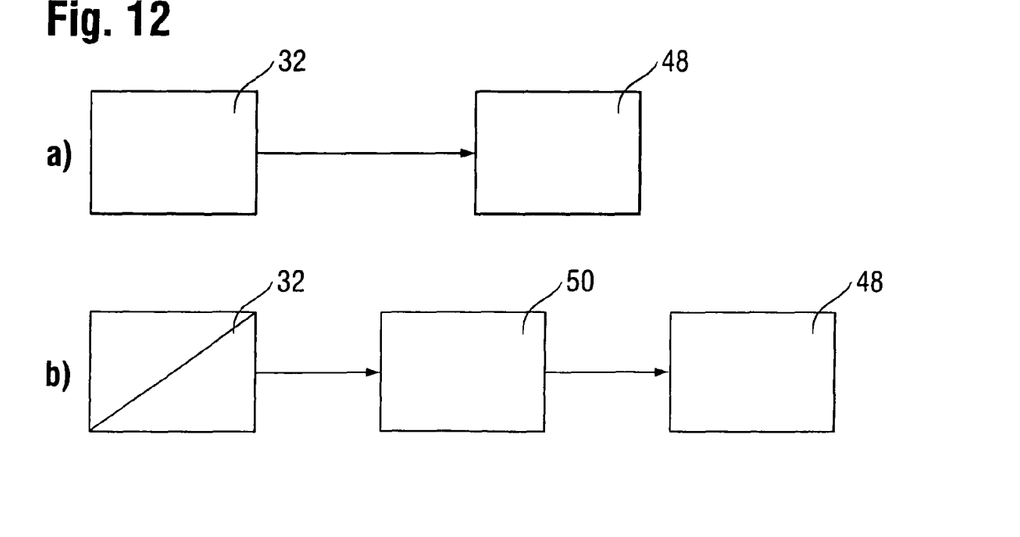
FIGS. 12a and 12b show block diagrams of sensor elements used in the belt webbing unwinding measuring means along with the associated control devices.

In all the embodiments described the sensor 32, as represented in FIG. 12, is coupled to a control device 48 which detects the belt webbing unwinding from the signals emitted by the sensor 32. The control device 48 is for example the control device of a gas bag module which directly reads in the output signal of the sensor 32 (FIG. 12a). Depending on the existing interface the output signal of the sensor 32 is transmitted as a PWM signal, an analog signal, a serial signal (serial peripheral interface SPI), or a two-wire signal according to the peripheral acceleration sensor protocol (PAS). If the sensor 32 is not provided with any interface suited for the read-in control device 48, the sensor signal may be read in by an interconnected microcontroller 50 and converted to an existing interface (FIG. 12b). These are usually conversions to CAN/LIN bus, SPI, or a two-wire interface (PAS).

The method in accordance with the invention of determining the belt webbing unwinding in the belt retractor 10 provides that the sensor 32 detects the rotation of the belt reel 14 at least during a force limitation phase of the belt retractor. Depending on the design of the belt webbing unwinding measuring means 34 the sensor 32 may detect any rotation of the belt reel 14, even already prior to a force limitation phase.

All the embodiments described are distinguished by few components, a small space requirement and a design without play and rattling.

The invention claimed is:
1. A belt retractor for a safety belt system, including
a frame (12),
a belt reel (14) rotatably mounted in said frame (12),
a locking mechanism (17) which couples said belt reel (14) in a restraint case to said frame (12),
a force limiter arranged between said belt reel and said locking mechanism whereby the force limiter allows a certain rotation of the belt reel after locking of the locking mechanism on account of forward movement of the occupant, and a belt webbing unwinding measuring means (34) which includes a signal transmitter (30) and at least one sensor (32), said sensor (32) being associated with said signal transmitter (30) and detecting a change in a magnetic field, said signal transmitter (30) including a separate wheel (42) which is coupled to said belt reel (14), said wheel (42) being disposed axially adjacent to said belt reel (14) and having a rotational axis that is non-coaxial to the rotational axis of the belt reel, at least upon activation of said locking mechanism (17) said signal transmitter (30) being coupled to said belt reel (14) such that it generates a signal upon rotation of said belt reel (14).

2. The belt retractor according to claim 1, wherein a permanent magnet (40; 46) is provided, a magnetic field being generated by said permanent magnet (40; 46).

3. The belt retractor according to claim 1, wherein said signal transmitter (30) is disposed on a side of said belt reel (14) facing away from said locking mechanism (17).

4. The belt retractor according to claim 1, wherein said signal transmitter (30) includes at least one magnet (40; 46).

5. The belt retractor according to claim 1, wherein a change in a magnetic field is achieved by a rotation of said signal transmitter (30) relative to said sensor (32).

6. The belt retractor according to claim 1, wherein a pyrotechnical tensioning unit (18) is provided, said signal transmitter (30) becoming coupled to said belt reel (14) upon activation of said tensioning unit (18).

7. The belt retractor according to claim 1, wherein said wheel (42) is a magnetic wheel.

8. The belt retractor according to claim 1, wherein a permanent magnet (46) is provided and said wheel (42) is a toothed iron wheel, said wheel (42) cooperating with said permanent magnet (46) that is spaced apart from said wheel (42).

9. The belt retractor according to claim 1, wherein said sensor (32) is a magnetic turning angle transmitter.

10. The belt retractor according to claim 1, wherein said sensor (32) is a magnetic-field sensor.

11. The belt retractor according to claim 1, wherein a control device (48) is provided, said sensor (32) being coupled to said control device (48) which determines said belt webbing unwinding from signals emitted by said sensor (32).

12. The belt retractor according to claim 11, wherein a microcontroller (50) is provided, signals emitted by said sensor (32) being at first converted by said microcontroller (50) and being passed on to said control device (48).

13. The belt retractor according to claim 1, wherein said signal transmitter (30) is coupled to said belt reel (14) such that it generates a signal upon rotation of said belt reel (14) in a belt unwinding direction when the locking mechanism (17) is activated.

14. The belt retractor according to claim 1, wherein said separate wheel (42) is spaced from a longitudinal axis of said belt reel (14).

15. The belt retractor according to claim 1, wherein said force limiter (19) comprises a torsion bar that allows for rotation of the belt reel (14) in a belt unwinding direction when the locking mechanism (17) is activated.

16. A method of determining the belt webbing unwinding in a belt retractor (10) comprising:

providing a frame (12), a belt reel (14) rotatably mounted in said frame (12), a locking mechanism (17) which couples said belt reel (14) in a restraint case to said frame (12), a force limiter arranged between said belt reel and said locking mechanism whereby the force limiter allows a certain rotation of the belt reel after locking of the locking mechanism on account of forward movement of the occupant, and a belt webbing unwinding measuring means (34) which includes a signal transmitter (30) and at least one sensor (32), said sensor (32) being associated with said signal transmitter (30) and detecting a change in a magnetic field, said signal transmitter (30) including a separate wheel (42) which is coupled to said belt reel (14), said wheel (42) being disposed axially adjacent to said belt reel (14) and having a rotational axis that is non-coaxial to the rotational axis of the belt reel, at least upon activation of said locking mechanism (17) said signal transmitter (30) being coupled to said belt reel (14) such that it generates a signal upon rotation of said belt reel (14), and detecting a rotation of said belt reel (14) with said sensor (32) during a force limitation phase of said belt retractor (10).

17. The method according to claim 16, wherein said sensor (32) detects any rotation of said belt reel (14), even already prior to a force limitation phase.

* * * * *